Dec. 4, 1951 — C. W. HANSELL — 2,577,463
DEVICE FOR TRANSMISSION AND RECEPTION
OF VERY-SHORT ELECTRICAL WAVES
Filed May 17, 1944 — 2 SHEETS—SHEET 1
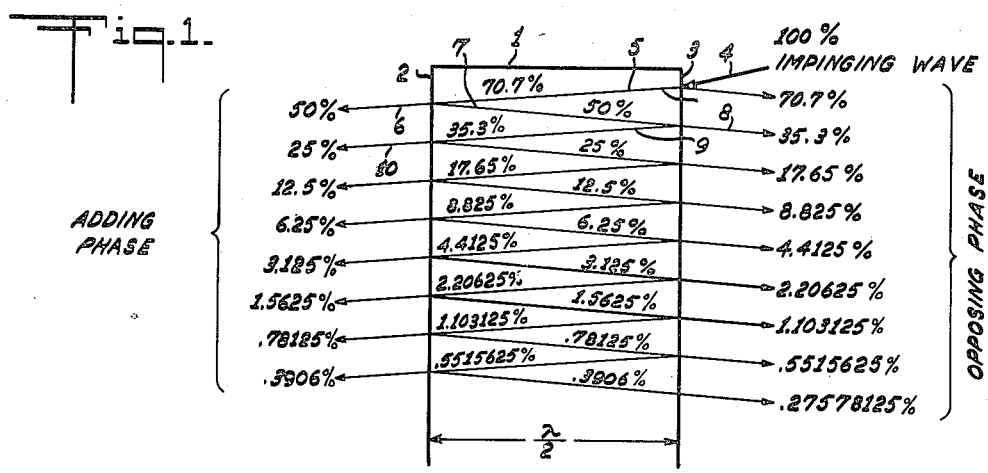
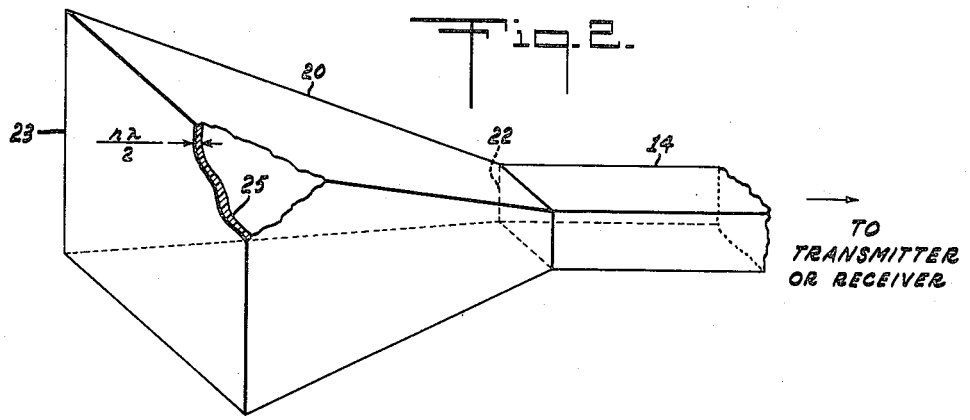
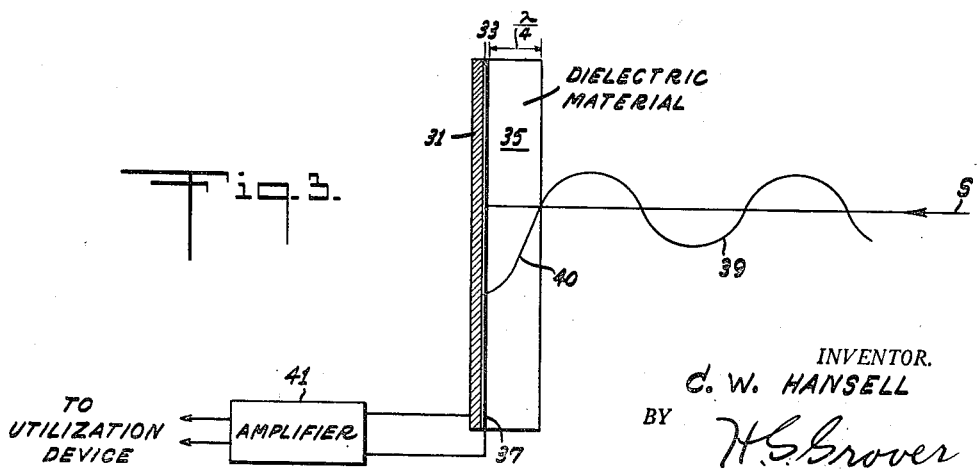
INVENTOR.
C. W. HANSELL
BY H. S. Grover
ATTORNEY.

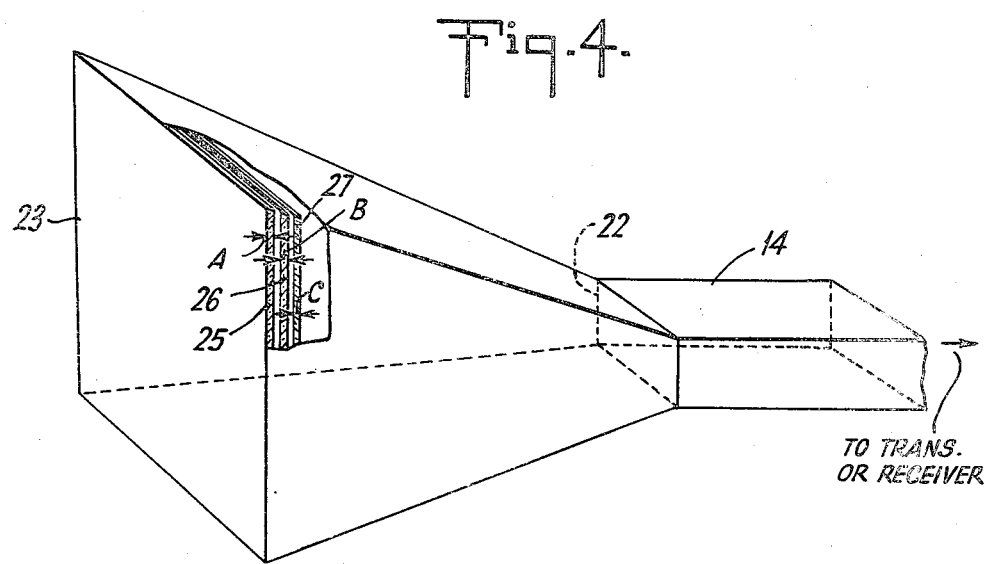

UNITED STATES PATENT OFFICE 2,577,463

DEVICE FOR TRANSMISSION AND RECEPTION OF VERY SHORT ELECTRICAL WAVES

Clarence W. Hansell, Rocky Point, N. Y., assignor to Radio Corporation of America, a corporation of Delaware Application May 17, 1944, Serial No. 535,951

1 Claim. (Cl. 250—33.63)

The present invention relates to circuit elements for facilitating the transmission and reception of ultra-high frequency electromagnetic waves and more particularly to impedance matching elements which may be interposed in the path of the radiant energy.

It is common practice in transmitting and receiving electromagnetic waves below one meter in length to employ parabolic reflectors which may be used with or without a hemispherical reflector having a radiator or receiving element at the center or focus of both reflectors. It is often undesirable to place the reflector and transmitting or receiving elements out of doors because such exposure makes the system subject to weather conditions such as rain, fog, snow, ice, wind, changing temperatures, etc., all of which may interfere seriously with the working of the system while the elements last and which may also cause relatively rapid deterioration of the elements comprising the equipment.

An object, therefore, of the present invention is to provide a means for sheltering the electrically active portions of the system so that normal operation may be obtained independent of weather conditions.

It is a further object of the present invention to provide a means, as aforesaid, for sheltering the system which will have little effect upon the radiation or reception of the radiant energy waves.

Another object of the present invention is to provide a wall or partition which is transparent to radiant energy waves and which is so constructed as to be selectively transparent for desired waves but relatively opaque for undesired waves.

Still a further object of the present invention is the provision of both frequency selectivity and increased sensitivity to radiant energy waves by an improved impedance match between the surrounding space and the rectifying element of a combined short-wave antenna and detector.

In the aspect of the present invention which deals with sheltering the system against weather conditions it is important that the sheltering means have little effect upon the radiation or reception. Since the radiant energy waves ordinarily must pass through a wall or sheltering surface, it is desirable that the wall have a minimum effect upon the waves. This effect has heretofore been obtained by providing a wall or sheltering surface which is very thin relative to a wave length of the radiant energy in the wall material. Then there will be little absorption and little reflection due to the wall. However, in many cases the wall cannot readily be made thin enough to present little reflection at its surface and in these cases considerable energy may be lost by reflection. This is more serious in a system being used for reception since, in this case, the reflected energy is mostly lost. When the system is being used for transmission the reflected energy may be returned to the radiating element and be again radiated.

In accordance with an aspect of the present invention it is proposed to stop reflections at the walls protecting the system by making the walls a half wave or multiples of a half wave in thickness, assuming the waves are measured at their velocity in the wall material. It can be shown that a sheet of insulating material having a dielectric constant and a refractive index greater than one can be made to show very small reflection under steady state conditions for waves passing through air and the insulating material in series, provided the insulating material is made a half wave or a multiple of a half wave in thickness and provided the losses in the material are not too great.

The present invention will be more fully understood by reference to the following detailed description which is accompanied by a drawing in which Figure 1 illustrates in diagrammatic form the conditions existing in a half wave dielectric sheet when a radiant energy wave is impinged upon one surface, while Figure 2 illustrates, partly in section and in perspective, a wave directive structure utilizing the principles of the present invention, while Figure 3 illustrates the application of the present invention to a combined radiant energy wave pick-up device and detector and Fig. 4 illustrates, partly in section and partly perspective, an alternate embodiment of the structure shown in Fig. 2.

Referring now to Fig. 1, reference numeral 1 indicates a dielectric body having parallel opposing faces 2 and 3, separated a distance equal to a half of the operating wave length or a multiple of a half wave length of the impinging energy. The refractive index of body 1 is assumed to be such that half the energy impinging on the boundary surfaces, from either within or without, the body is reflected and half passes through. Then an original beam 4, of 100% intensity, striking surface 3, has half of its energy reflected back and half passed through as indicated by line 5. The reflected and passed waves have 70.7% of the amplitude of the original wave. At the surface 2 the passed beam 5 again has its energy split and 50% of the energy passes on to the left of the figure as indicated by the arrow 6, and 50% is reflected back to the surface 3 as indicated by line 7. At surface 3 again 50% of the energy is passed through the boundary as indicated by arrow 8 and another 50% is reflected back as indicated by line 9. Thus, lines 8 and 9 each represent 35.3% of the original 100% wave. At surface 2 again, the wave is again split and 25% of the original energy, as indicated by arrow 10, is passed through and the remainder reflected back. The process is repeated again and again by the reflected portion until finally an infinitesimal part remains. The reflection of the portion of the original beam has a certain phase angle when it leaves surface 3. The portion of the first returning wave from boundary 2 which passes through boundary 3, and all the others like it, has a phase opposite to the first reflected wave from the original surface. Therefore, the final total reflected energy in the body directed toward the source of the impinging wave in the steady state where a large number of waves are reflecting at any one time is proportional to $$70.7\% - (35.3 + 17.65 + 8.825 + 4.4125 + 2.20625 \ldots)$$

This is an expression of the form $$n - (n/2 + n/4 + n/8 + n/16 + n/32 \ldots)$$

the value of which approaches zero. Thus, in the steady state, when the wall is a half wave or a multiple of a half wave in thickness, the cancellation of the first reflected waves by multiple reflected waves is substantially complete and the wall is no barrier to the passage of the waves.

Referring to Figure 1, it will be noted that the passed waves have amplitudes of 50%, 25%, 12½%, 6¼%, etc., which, when added up in the steady state, are proportional to $$n/2 + n/4 + n/8 + n/16 \ldots, \text{ etc.}$$

which has a value approaching 1, or approaching 100%. Thus, all the energy incident on surface 3 emerges on surface 2 if we assume no losses in the wall. If there are losses, the energy passing through is somewhat reduced.

If the wall is given a thickness which is an integral multiple of a half wave thick the reflections also cancel out in the manner illustrated in Fig. 1 except that, if there are losses in the wall, the total amount of the loss is increased and a small reflection may also take place due to lack of perfect cancellation of the reflected waves.

The principle as above discussed with reference to Figure 1 may be applied to an actual physical improvement as shown in Figure 2. In this figure there is shown a wave directive structure in the form of a tapered horn antenna 20 having a throat aperture 22 and larger mouth aperture 23. The throat aperture is coupled to the desired transmitting and receiving equipment by means of a wave guide 14.

This wave directive structure has been shown in the form of a wave guide and tapered horn. Obviously of course, a parabolic reflector with an antenna at the focus of the reflector could equally well be used.

The mouth aperture 23 of the wave directive structure is closed by a wall 25 of dielectric material to prevent the entrance of rain, snow, etc., into the horn.

In accordance with the principles of this invention, the wall 25 has a thickness equal to any multiple including unity of one half of the operating wave length so that the reflection reducing phenomena discussed above takes place. The wave directive structure 20 operates almost as efficiently then, as though the mouth aperture 23 were open instead of closed by dielectric material.

If, instead of the wall being a half wave thick, it is a quarter of a wave length in thickness, then, instead of 100% transmission, we have maximum reflection.

The first wave reflected from surface 3 still has 70.7% amplitude and the next wave travelling in the same direction adds to it directly in phase. The final result is a reflected amplitude of $$70.7 + 35.3 + 17.65 + 8.825 + 4.4125, \text{ etc.}$$

resulting in a final total amplitude of $$A = \frac{70.7 + 35.3}{1 - \frac{1}{4}} - \frac{17.65}{1 - \frac{1}{4}}$$

which equals 94.2% amplitude. This corresponds to a reflected energy of about 88.75%. The waves emerging from boundary surface 2 no longer add but alternate amplitude components oppose, giving a final amplitude of $$A = 50\% - 25\% + 12\frac{1}{2}\% - 6\frac{1}{2}\% + 3.125\% \ldots \text{ etc.}$$

which, reduced, gives a final amplitude of 33.3%. This corresponds to about 11¼% of the original incident energy. Thus, it may be seen that walls or partitions or laminations of spacing material of different reflection index have maximum transparency when the laminations are a half wave or multiples of a half wave in thickness and minimum transparency when they are a quarter wave or odd multiples of a quarter wave in thickness.

Thus, we have available a means for constructing systems selectively transparent for desired waves but relatively opaque for undesired waves. This is of practical value, particularly in the reception of waves below about ten centimeters in length.

Now, if it is assumed that we wish to construct a window for a wave directive structure which acts as a selective filter to freely admit a desired wave length but reject all other waves as much as possible, this may be done by making the window of alternate layers of air and some material having a higher dielectric constant. For example, if a material having a dielectric constant of 9 at the operating wave lengths is used, then the material will have a refractive index of 3 compared with 1 for air. The reflection at each of the surfaces separating the air and the dielectric material will be $$R = \frac{I}{I_0} = \frac{(n-1)^2}{(n+1)^2} = \frac{(3-1)^2}{(3+1)^2} = 0.25$$

or 25% in energy or 50% in amplitude, I being the intensity of reflected energy obtained with $I_0$ energy applied and $n$ being the index of refraction of the dielectric material.

For the desired wave the layers should each have a thickness of a half wave or multiples of a half wave and the reflections at the two surfaces of each layer of dielectric material thus nullify one another and substantially 100% transmission occurs at the desired frequency.

Harmonics of the desired frequency will also be passed with small attenuation, particularly those harmonics where the layers also are multiples of a half wave in thickness.

For all frequencies where the layers are a quarter wave or odd multiples of a quarter wave in thickness, minimum transmission occurs. In the case of materials with a dielectric constant of 9, as in the above example, each layer of itself passes only about 10% of the energy impringing upon it. The several successive layers multiply their suppression effects to give very low passed energy. Intermediate frequencies are suppressed in varying degrees.

The window may, for example, be constructed of alternate layers of dielectric material and air, having thicknesses of ½, 1, 1½, 2, 2½ and 3 waves.

Certain of the harmonic frequencies may be rejected by utilizing thin layers of dielectric material in the window. That is, for example, the second harmonic may be rejected by one or more layers one-eighth wave in thickness for the fundamental frequency. Such a layer does not reject much of the desired wave, since it is so thin compared to the wave length of the desired wave, but greatly reduces the 2nd, 6th, 10th, 14th, 18th, etc., harmonics.

Likewise, layers one quarter wave in thickness for the third harmonic reject the 3rd, 9th, 15th, 21st, etc. harmonics and are also of such small thickness compared to the wave length of the fundamental as to cause little attenuation of the fundamental.

Furthermore, layers one quarter wave in thickness for the fourth harmonic reject the 4th, 12th, 20th, 28th, etc. harmonics.

Referring to Fig. 4 there is shown an embodiment of the invention incorporating a plurality of dielectric covers by means of which the above described results are obtained. Various combinations of these windows may be employed to secure a desired effect, for example, dimension A of dielectric sheet 25 may be an integral multiple of half-wavelengths at a desired operating frequency in order to secure transmission at a desired frequency while the dimension B of dielectric sheet 27 and dimension C of dielectric sheet 28 may be odd multiples of one-quarter of the wavelength of higher frequencies desired to be suppressed. A plurality of dielectric sheets may be dimensioned to effect transmission, for example, dimension A of dielectric sheet 25 may be an integral multiple of half-wavelengths of a first frequency and dimension B may be an integral multiple of a half-wavelength of a second frequency, the waves of both of which frequencies are to be transmitted, and dimension C may be an odd multiple of a quarter-wavelength of still another frequency desired to be suppressed.

Of course, in addition to the use of the wave selection properties of the window covering the apertures of the wave directive structure, the wave directive structure itself should be designed to provide maximum performance for the desired wave, thus additionally increasing the selectivity.

The basic principle included in the present invention may also be employed to advantage in a combined pick-up device and detector which is shown in Figure 3.

In this figure there is shown a copper oxide or barrier layer rectifier of large area. This rectifier includes a base plate 31, a rectifying layer 33, and a second electrode 37, which is so thin as to be pervious to the desired waves. This principle has heretofore been employed in copper oxide or barrier layer photocells.

When utilizing such a rectifier, a uni-directional current may be obtained by causing electromagnetic waves to impinge upon the surface formed by the thin electrode 37. The A. C. potentials across the barrier layer 33 cause rectification and a direct current may be drawn from the rectifier through an external circuit connected to the two electrodes.

The resistance and dielectric capacity of the rectifier make it an inherently low impedance device whose receiving efficiency for waves is, under ordinary circumstances, not very good because most of the energy of the waves is reflected by short circuit or low impedance reflection. In order to increase the sensitivity of the device, means are provided for matching the characteristic of the surrounding air to that of the rectifier more closely. This is done by covering the surface of the rectifier by a layer of dielectric material 35 having a dielectric constant greater than 1. Preferably this layer of dielectric should have a thickness of substantially one quarter wave or of an odd multiple of one quarter wave for the waves to be received, in which case a maximum response is obtained in the rectifier due to the incidence of the desired waves.

In Figure 3, S represents the direction of arrival of desired signal which is represented by wave 39. It will be noted that, within the dielectric material 35 the displacement current, or electric field component of the wave, is increased due to the dielectric constant of the covering material. This is shown by portion 40 of curve 39.

The rectified potential obtained from the barrier layer 33 may be applied to a suitable amplifier 41 and from this conducted to any desired utilization device.

While I have shown the modification of Figure 3 as utilizing a solid dielectric material 35, if desired, the dielectric layer may be made up of liquid held in place by other dielectric material.

Thus, combinations of dielectric materials may be used, if properly dimensioned. Water and alcohol, for example, have the advantage of a very high dielectric constant and refractive index and thus provide a large increase in the current through the rectifier surfaces.

Furthermore, the form of the detector shown in Figure 3 is not limited to copper oxide rectifiers since any form of rectifier with which it is possible to make the impinging rays set up potentials across the rectifier surfaces may be used.

Furthermore, the thin layer 33 of Figure 3, instead of being a copper oxide film, may be "Thyrite" which has the characteristic of showing a decrease in resistance due to impinging waves. A direct current through the layer of "Thyrite" will thus be modulated in accordance with the modulations on the received signal.

While I have illustrated several particular embodiments of the present invention, it should be clearly understood that it is not limited thereto since many modifications may be made in the several elements employed and in their arrangement, without departing from the spirit and scope of the invention.

Having now described my invention, what I claim as new and desire to have protected by Letters Patent is:

A closure for the open end of a radiant energy wave directive horn structure connected at the other end to a wave guide, said closure including a plurality of sheets of dielectric material completely covering said open end of said horn structure, said sheets having relatively large faces and narrow edges, the faces of said sheets being disposed in a plane perpendicular to the direction of propagation of the received or transmitted radiant energy waves, one of said sheets having a thickness in the direction of propagation of an integral multiple, including unity, of a half wavelength of a first frequency of said radiant energy, a second of said sheets having a thickness in the direction of propagation of an integral multiple, including unity, of a half wavelength of a second frequency higher than said first frequency, whereby energy having wavelengths of said first frequency and of said second frequency may be transmitted or received, and a third of said sheets having a thickness in the direction of propagation of an odd multiple, including unity, of one quarter wavelength of a third frequency higher than said second frequency whereby the transmission or reception of said third frequency is attenuated.

CLARENCE W. HANSELL.

REFERENCES CITED

The following references are of record in the file of this patent:

UNITED STATES PATENTS

| Number | Name | Date |
|---|---|---|
| 1,962,155 | Pierce | June 12, 1934 |
| 2,112,282 | Fritz | Mar. 29, 1938 |
| 2,130,389 | Gothe | Sept. 20, 1938 |
| 2,170,028 | Kohl | Aug. 22, 1939 |
| 2,206,923 | Southworth | July 9, 1940 |
| 2,265,796 | Boersch | Dec. 9, 1941 |
| 2,298,272 | Barrow | Oct. 13, 1942 |
| 2,405,992 | Bruce | Aug. 20, 1946 |
| 2,407,211 | Tonks et al. | Sept. 17, 1946 |
| 2,415,352 | Iams | Feb. 4, 1947 |
| 2,429,601 | Biskeborn et al. | Oct. 28, 1947 |
| 2,438,343 | McClellan | Mar. 23, 1948 |

OTHER REFERENCES

Physical Optics, by Wood; MacMillan Co., 1911; pages 155 to 158.